March 14, 1944.  W. B. PAYNE  2,344,453
COLLATING AND POSTING DEVICE
Filed May 31, 1943  5 Sheets-Sheet 1
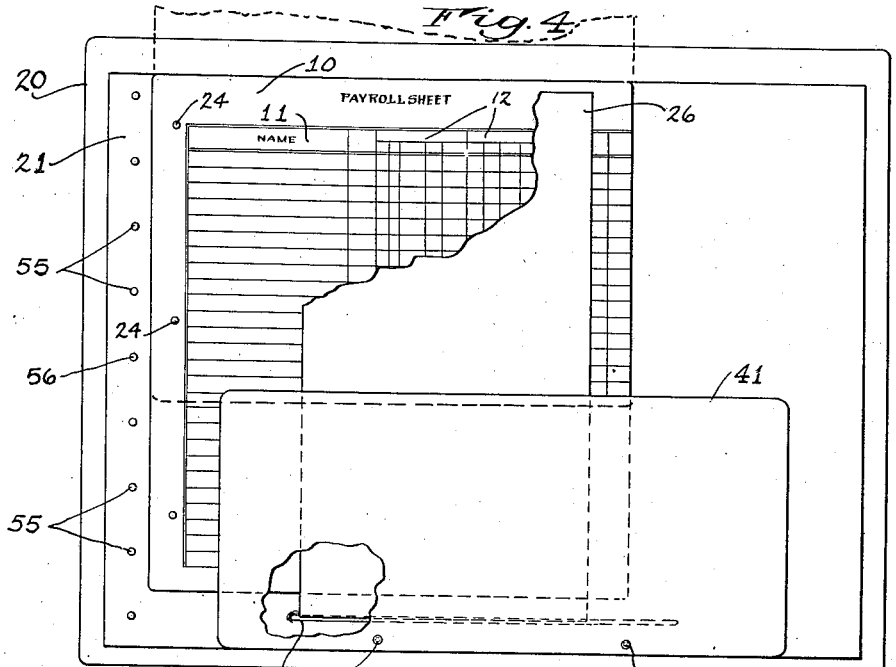
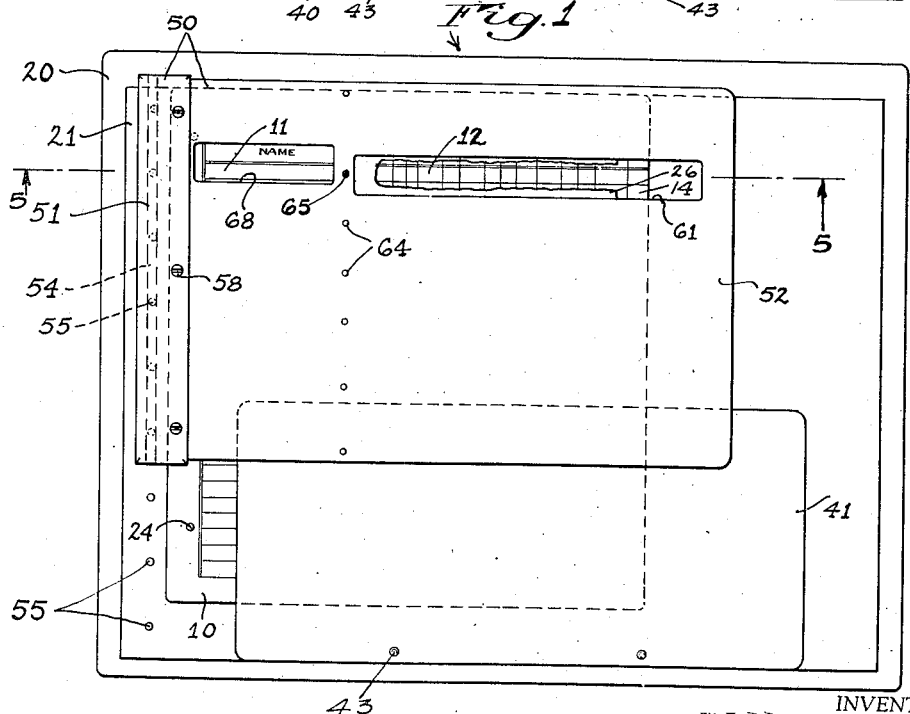
INVENTOR.
Walter B. Payne
BY Raymond L. Bohrer
his Attorney March 14, 1944. W. B. PAYNE 2,344,453
COLLATING AND POSTING DEVICE
Filed May 31, 1943 5 Sheets-Sheet 2

INVENTOR.
Walter B. Payne
BY Raymond L. Bohrer
his Attorney

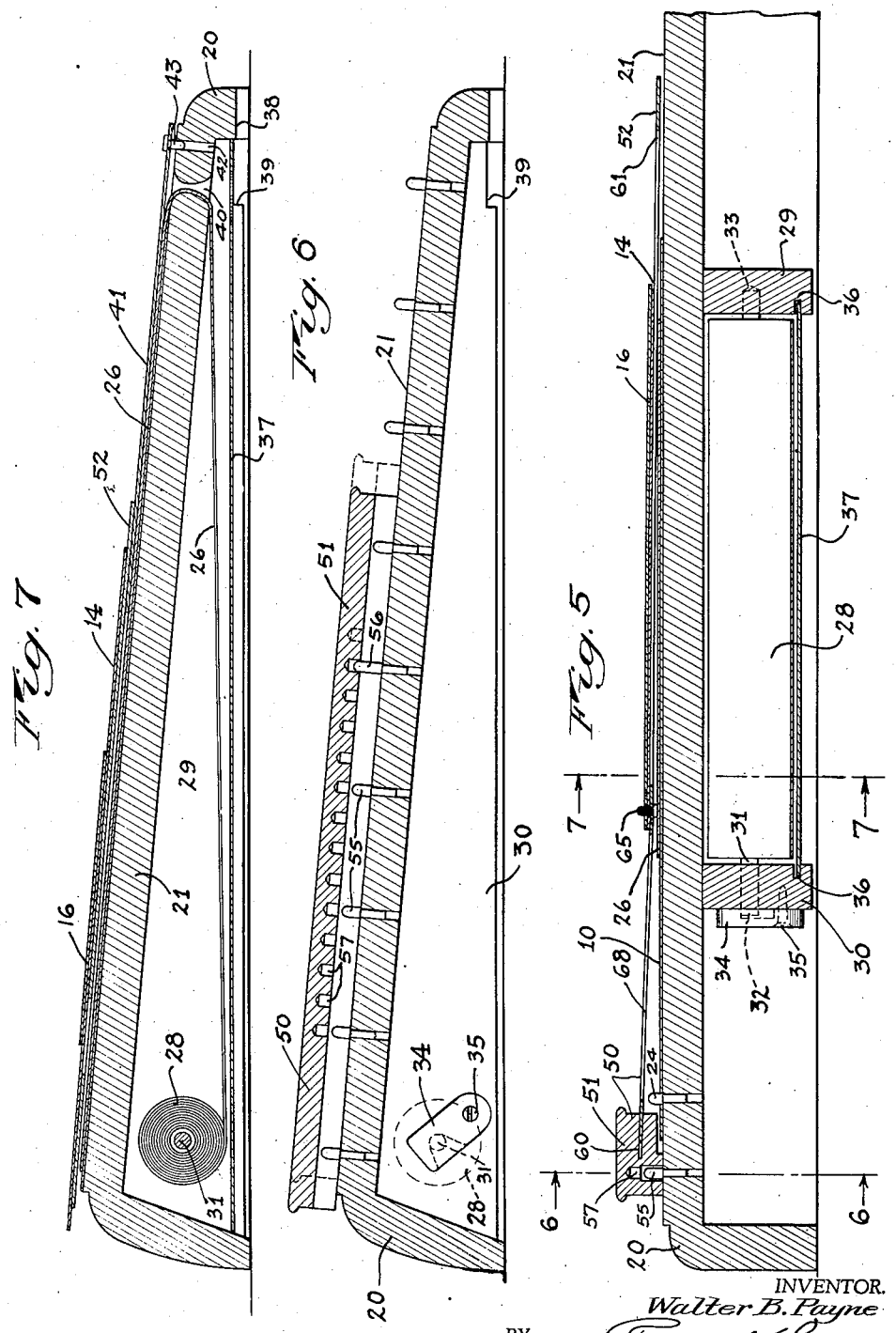

March 14, 1944.  W. B. PAYNE  2,344,453
COLLATING AND POSTING DEVICE
Filed May 31, 1943   5 Sheets-Sheet 4
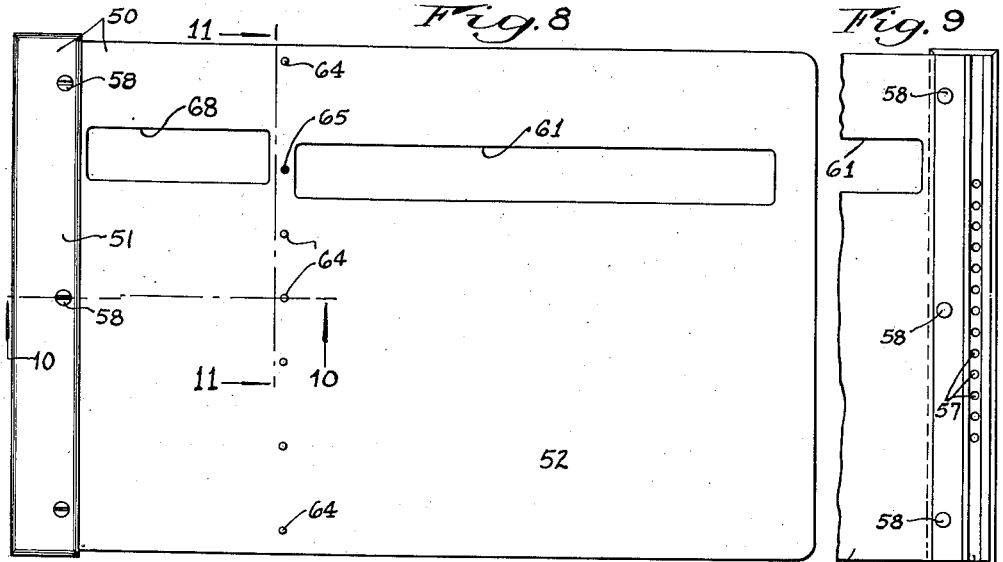
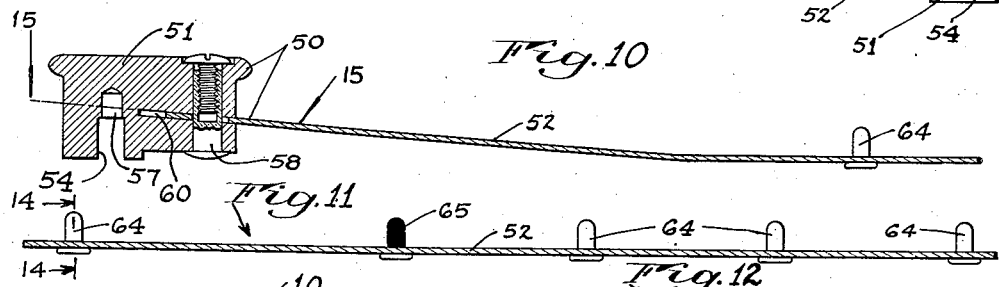
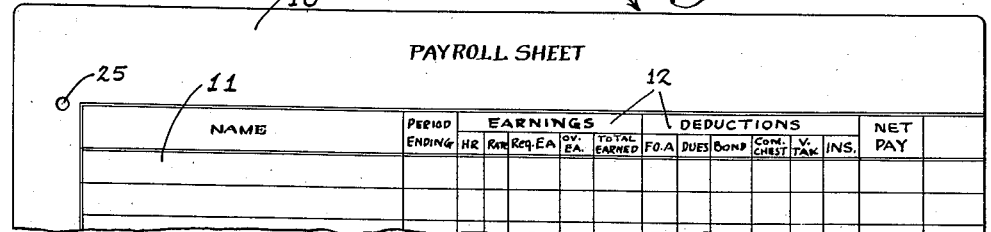
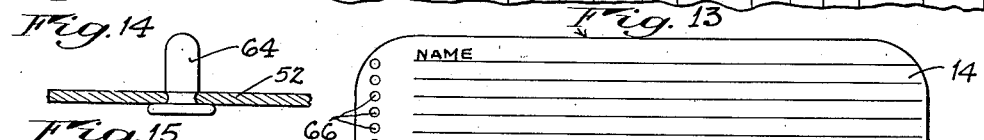
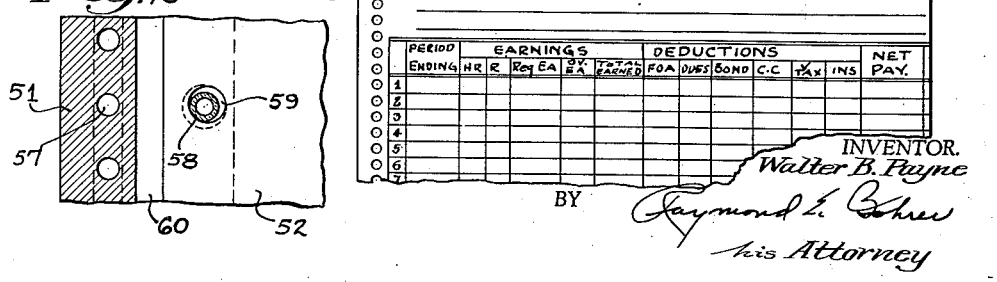
INVENTOR.
Walter B. Payne
BY
his Attorney

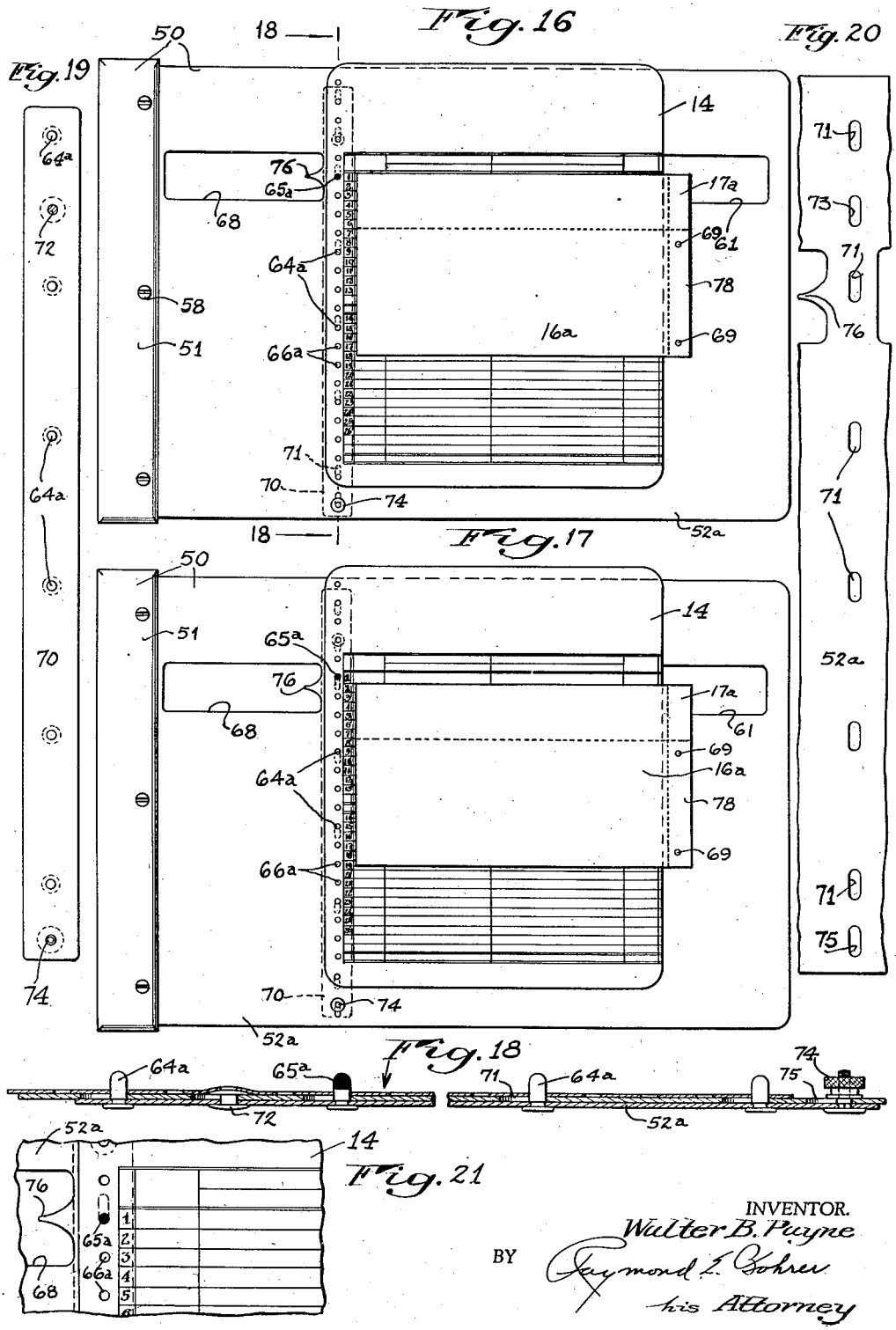

Patented Mar. 14, 1944

2,344,453

UNITED STATES PATENT OFFICE 2,344,453

COLLATING AND POSTING DEVICE

Walter B. Payne, Rochester, N. Y., assignor to The Todd Company, Inc., Rochester, N. Y., a corporation of New York Application May 31, 1943, Serial No. 489,190

18 Claims. (Cl. 282—3)

The present invention relates to improvements in a sheet collating and posting device, such as an appliance adapted to receive business forms of different size and character and to hold the forms in manifolding relation, and by the use of which entries may be posted on the original or uppermost sheet and transferred to the underlying sheets at one writing. One important advantage of the device resides in the fact that provision is made to readily position the various record sheets with predetermined entry lines at the variable writing line of the appliance. It is particularly useful in assembling a set of separate record sheets so as to carry out the bookkeeping operations essential in the manual posting of entries relative to payroll or other disbursements as well as accounts receivable, such as installment accounts of merchants, loan or finance organizations, or other business institutions.

A further object is the provision of a collating and posting device arranged to receive and hold a master sheet having successive lines upon which entries are to be posted. The construction further provides a shiftable auxiliary means arranged to position the entry line of one or more other record sheets in register with a predetermined entry line of the master sheet.

Another object of the invention is the provision of a simple and portable collating and posting device having practically no complicated moving or mechanical parts adapted to wear out or require service and repair. The construction is such that substantially the entire device may be made of non-metallic materials.

A still further object of the invention resides in the provision of a construction which provides a flexible collating and posting device wherein the sheet carrying and positioning parts may be adjusted to handle various forms or take care of variations in the sheets due to manufacturing inaccuracies as well as any expansion or contraction of the printed paper forms due to climatic condition.

A further object of the invention is to provide means whereby a small and compact machine of the character mentioned may be so constructed as to permit of its use with a record sheet having positioning apertures spaced differently from the spacing of the entry lines on the sheet.

To these and other ends the invention resides in certain other improvements and combinations of parts, all as will be hereinafter more fully described, the novel features being pointed out in the claims at the end of the specification.

In the drawings:

Fig. 1 is a plan view of the collating and posting device showing a certain form positioned on the writing bed and the shiftable auxiliary sheet holding unit in the uppermost position.

Fig. 4 is a plan view similar to Fig. 1 but with the displaceable auxiliary sheet holding unit removed from the base, and a record sheet, such as the master payroll register or journal sheet positioned thereon.

Fig. 5 is a transverse vertical section taken substantially on the line 5—5 of Fig. 1, showing the various sheet holding pins, the auxiliary sheet holding unit and the carbon transfer supply roll and support therefor arranged in the base of the device.

Fig. 6 is a longitudinal vertical section taken substantially on the line 6—6 of Fig. 5.

Fig. 7 is a longitudinal vertical section taken substantially on the line 7—7 of Fig. 5, disclosing among other things, the manner in which the carbon strip is led to the writing bed and interposed between the master sheet and the sheet carrier member of the auxiliary holding unit.

Fig. 8 is a detail plan view of the detachable auxiliary sheet holding unit.

Fig. 9 is a fragmentary bottom view of the auxiliary unit showing the longitudinal guide groove in the grip bar thereof and the spaced centering recesses formed in the bottom of the groove of the bar.

Fig. 10 is a transverse vertical section taken substantially on the line 10—10 of Fig. 8.

Fig. 11 is a longitudinal section taken substantially on the line 11—11 of Fig. 8.

Fig. 12 is a fragmentary view of a business form, such as a master payroll register or journal sheet, adapted to be collated on and posted by use of the device.

Fig. 13 is a fragmentary view of another form, such as an employee's earnings or compensation record.

Fig. 14 is a vertical section taken substantially on the line 14—14 of Fig. 11.

Fig. 15 is a transverse section taken substantially on the line 15—15 of Fig. 10.

Fig. 16 is a plan view of the removable auxiliary sheet holding unit showing a modified form of the invention providing an adjustable pin holding strip for the forms to be collated.

Fig. 17 is a plan view similar to Fig. 16 but showing the adjustable holding pin strip in another position.

Fig. 18 is a longitudinal vertical section substantially on the line 18—18 of Fig. 16.

Fig. 19 is a detail plan view of the adjustable pin strip supported on the sheet holding member of the auxiliary unit.

Fig. 20 is a fragmentary plan view of a sheet carrier member of the auxiliary sheet holding unit showing the arrangement of slots and apertures formed therein.

Fig. 21 is a somewhat enlarged fragmentary plan view showing the adjustable pin strip on the carrier member of the auxiliary holding unit in the position shown in Fig. 16 and a record sheet positioned with the first entry line aligned with the writing line of the device.

The reference numerals throughout the several views indicate the same parts.

The invention comprehends a collating and posting or writing device adapted for use in record making operations essential to disbursement and accounts receivable procedures. While the device may be used for various types of record making or bookkeeping operations, it will be described, by way of example, in connection with a payroll disbursement procedure. In modern payroll practice it is essential to produce complete records to comply with Federal and State requirements, as well as to supply each employee with a record of regular, overtime, and bonus earnings, and all deductions, including items such as the withholding tax, social security, unemployment and group insurance, etc. In order to avoid discrepancies between the different payroll records, reduce the time required to produce the records and to provide an efficient procedure, it has been found highly desirable to produce all the records at one time.

According to modern payroll practice it is essential to prepare a master payroll register, individual earning record, and a pay check or cash envelope bearing information as to earnings and deductions. A representative of a payroll register or journal sheet 10 is shown by way of example in Fig. 12, and comprises a master sheet having successive lines for the reception of the employee's name and upon which entries are to be posted. One side of the sheet 10 is shown with portion 11 for the reception of the employee's identification and the other side with a portion 12 having vertical columns arranged for entry having to do with earnings and deductions.

Figure 2:
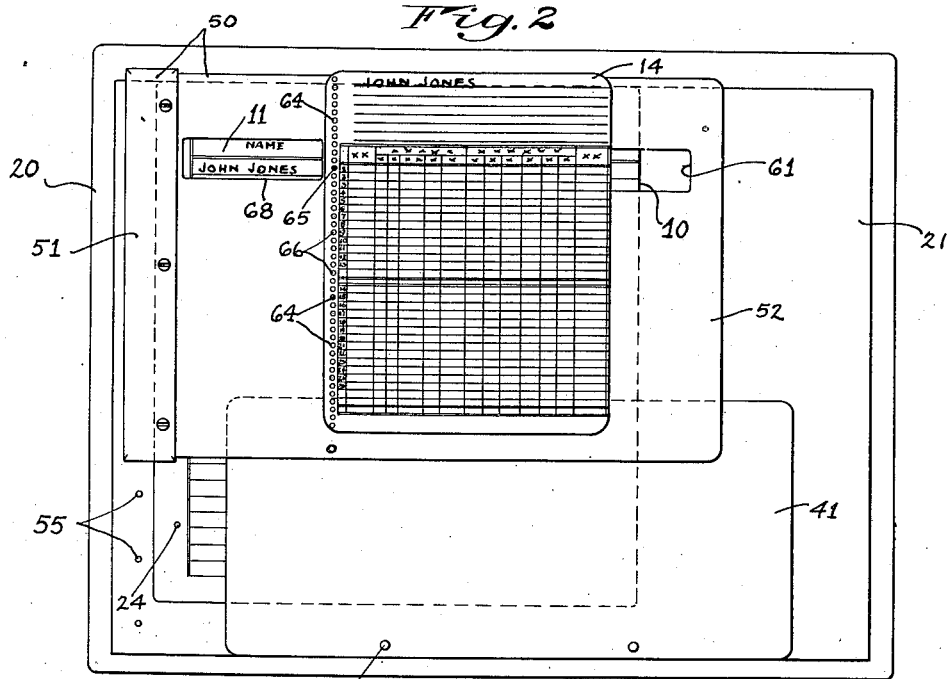
Fig. 2 is a plan view similar to Fig. 1 but showing a record sheet positioned on the auxiliary sheet holding unit, such as an employee's earning or compensation record sheet.

An individual earnings or compensation record sheet is also used for the purpose of producing a period or annual report of weekly transactions of each employee. A representation of an earnings or compensation record sheet 14 is disclosed in Figs. 2 and 13 of the drawings. This record sheet is preferably provided with a history record at the top, and the main portion having weekly entry lines and vertical columnar headings corresponding to the portion 12 of the master payroll sheet 10.

With pay-by-check procedures, it has been found advantageous to use a check form having a detachable stub portion adapted to carry a record of earnings and deductions. A representation of a check 16 with a removable voucher stub portion 17 provided with a posting line is shown, by way of example, in Fig. 3 of the drawings. While the record of earnings and deductions may be embodied in the body of a pay check or cash envelope, it is common practice to inscribe such information on a detachable stub portion of a check or envelope so that the record may be retained by the employee.

In the use of the present invention the master payroll register or journal 10 is first positioned on the writing bed of the device and adapted to have a line of entry transferred thereon in each posting operation. A strip of carbon is then placed on the master sheet and adapted to transfer writing inscribed on forms placed thereover. The individual earnings or compensation record sheet 14 and the check 16 with a voucher stub are positioned on the device with the entry lines thereof in register with a predetermined entry of the master sheet. The forms are positioned on the device in superimposed manifolding relation so that any inscription made on the entry line of the original or top form is transferred to the underlying payroll sheets.

Referring now to the drawings, the device is provided with a base 20 having an inclined writing bed surface 21. As best seen in Figs. 1, 4, and 5, a longitudinal row of holding pins 24 are mounted on the base and project above the plane of the writing bed surface. The row of pins 24 is arranged adjacent the left side of the upper bed surface and adapted to engage perforated holes 25 in the master payroll register or journal sheet 10. The perforated master payroll sheet 10 is provided with successive lines upon which entries are to be posted.

In Fig. 4 of the drawings, the master sheet 10 is shown impaled upon the studs 24 and positioned on the writing bed 21 of the base for the reception of entries thereon. In order to facilitate the manual posting operation with the device, it has been found preferable to position the master sheet 10, as shown in the full line of Fig. 4, for initially posting the upper half of the sheet. While the entire sheet may be posted in this position, it has been found advantageous to move the master sheet 10 to the dotted line position shown in Fig. 4, for posting the lower half of the sheet. In the latter position, the two uppermost studs 24 receive and retain the sheet 10 during the posting operation. The employees' names, clock numbers, and other desirable data is usually placed on the portion 11 of the payroll register or journal sheet 10 prior to the sheet being positioned on the device. The employee's data may be arranged on the payroll register according to departments or divisions and either written thereon or imprinted with an addressing machine. However, as hereinafter described, the name portion 11 of the master payroll register may be written while the sheet 10 is positioned on the device at the same time and along with the posting operations.

After the master sheet 10 has been impaled on the studs 24 and positioned on the writing bed 21, a transfer strip 26 is laid over the portion 12 of the sheet 10 adapted to receive the entries having to do with the employee's earnings and deductions. While the transfer strip may be a separate sheet, it has been found advantageous to provide a continuous web of carbon material. Referring to Figs. 5, 6, and 7, it will be seen that a roll 28 of transfer material is suitably supported within the base 20 of the device. A pair of spaced cleats 29 and 30 are mounted on the under side of the writing bed 21 and adapted to receive the carbon roll 28 therebetween. The carbon roll 28 is supported by a rod 31 adapted to be inserted through an aperture formed in the cleat 30. The cleat 29 is provided with a recess 33 adapted to receive one end of the rod 31 to support the other side of the carbon roll. The opposite end 32 of the rod 31 extends beyond the outer side of the cleat 30 so that it may be grasped and withdrawn to permit replacement of the carbon roll. A recessed holding member 34 for the rod 31 is pivoted at 35 to the cleat 30 and adapted to be swung about its pivot to permit withdrawal of the rod 31.

The cleats 29 and 30 are formed with longitudinal slots 36 adjacent their bottom edge to support a bottom plate 37 of a flexible material. The front portion of the base 20 is provided with recessed portion 38 at the bottom edge to permit the plate 37 to be inserted in the slots 36. However, the slots 36 are arranged in a plane that is slightly above the edge of the portion 38 of the base. The front ends of the cleats 29 and 30 adjacent the front end of the base are cut away at 39 for clearance purposes. The arrangement provides that in positioning the flexible plate 37, the leading end thereof is inserted in the slots 36. Due to the fact that the slots 36 are in a different plane from the edge of the recess 38 of the base, the flexible plate 37 will be bowed slightly until the end passes beyond the edge of the portion 38. After the plate 37 is properly positioned within the base, the end thereof snaps behind the edge of the portion 38 of the base so as to prohibit displacement thereof. When it is desired to remove the plate 37 for replacing the carbon spool 28, it is only necessary to flex the end of the plate beyond the portion 38 of the base and slide the plate from the slots 36.

The leading end of the carbon strip from the roll 28 is extended toward the front of the posting device and passed through an elongated opening 40 formed in the base, Figs. 4 and 7. A sufficient length of the carbon strip is unwound from the roll so that it will overlie the master payroll sheet 10 previously positioned on the writing surface of the base. Inasmuch as most carbon paper permits of several writings to be transferred from the same area thereof it has been found that it is unnecessary to advance the carbon strip after each posting operation. When a fresh area of the carbon is needed, it is only necessary to grasp the end and pull it from the supply roll. It is to be understood that the used portion of the carbon paper is then torn off and discarded.

A stationary guard plate 41 is removably supported on the base 20 and intended to protect and prevent the underlying carbon from transferring during posting operations. As best seen in Figs. 1, 4, and 7, the guard plate 41 overlies the carbon along the front end of the device. The base 20 is provided with holes 42 adapted to receive stud 43 carried by the plate 41 for removably mounting the guard on the base.

After the master payroll register or journal sheet 10 has been positioned on the writing bed and the carbon strip 26 superimposed thereover, an auxiliary record sheet holding unit, generally indicated by the reference numeral 50, is mounted on the base of the device to position and hold one or more record sheets with the entry line thereof in manifolding register with a predetermined entry line of the master sheet 10.

As best seen in Figs. 1, 8, and 10 of the drawings, the auxiliary sheet holding unit 50 includes a grip bar 51 and a sheet holding member or carrier 52. The grip bar 51 is adapted to be grasped by the operator for positioning the auxiliary unit on the writing bed 21 of the base. The bottom of the bar 51 is provided with a longitudinal groove or channel 54 throughout its entire length. The grooved bar 51 is arranged to be placed over a series of guide pins 55 carried on the base 20 and projecting above the plane of the upper surface of the writing bed surface 21. The series of pins 55 serve to guide the bar 51 for longitudinal movement with respect to the master sheet 10 positioned on the writing bed of the device.

The grip bar 51 is also formed with a series of recesses 57, preferably spaced to substantially correspond with the spacing of the entry lines on the master sheet 10. A locating or centering pin 56 is mounted on the base 20 and adapted to enter one of the recesses 57 of the series to properly position the bar 51 with relation to the lines on the master sheet for the purpose hereinafter more fully described. It will be obvious that the centering recesses 57 and the cooperating centering means 56 may be arranged in a number of different ways. However, for the purpose of the present disclosure, applicant has arranged the series of spaced recesses 57 in the bottom of groove 54 of the bar 51. One of the series of pins 55 preferably positioned intermediate the ends of the series, serves as a centering means and is designated by the reference numeral 56. The centering pin 56 is of a length greater than the depth of the groove formed in the bar 51 and adapted to enter one of the recesses 57 to position and hold the grip bar 51 of the auxiliary unit in a predetermined selected position.

Referring to Figs. 5 and 10, it will be seen that the grip bar 51 is formed with a slot 60 for supporting the sheet holding member or carrier 52. The slot 60 is provided in the side of the bar 51 adapted to be positioned adjacent the master sheet holding pins 24 on the base 20. As viewed in Fig. 5, the slot 60 is formed so that when the bar is mounted on the base 20 of the device, the slot is above the plane of the extremities of the pins 24. A plurality of bolts 58 are provided to clamp the sheet carrier member 52 within the slot 60 of the grip bar 51. As best seen in Figs. 8, 10, and 15 of the drawings, the bolts pass through the bar 51 and holes 59 in the carrier member 52. The holes 59 of the member 52 are slightly larger than the bolts 58 so as to permit the carrier member to be adjusted relative to the bar 51 by merely loosening the bolts for the purpose hereinafter more fully described.

The sheet carrier member 52 may be any suitable contour but in the present instance it is shown as a rectangular-shaped member of plastic or other sheeting material. The free end portion of the member 52 is adapted to overlie the carbon strip 26 and the master sheet 10 on the writing bed of the device. Along with the function of carrying the record sheets, it also serves as means to protect the carbon, especially to prevent undesired marking from being transferred to the master sheet. An aperture 68 is provided in the carrier member 52 to expose the employee's name portion 11 of the master sheet 10. In the event the employee's names are not imprinted on the master sheet prior to posting they may be inscribed thereon through the opening 68.

The carrier member 52 is also provided with a cut-away formation 61 to permit entries to be transferred to the earnings and deduction portion 12 of the master payroll sheet 10. A longitudinal row of spaced pins 64 is mounted on the carrier member 52 to one side of the transverse cut-away formation 61. The pins 64 are adapted to receive and removably retain one or more perforated record sheets, such as the earnings record 14 and the voucher check form 16. One of the pins of the series, designated by the reference numeral 65, is positioned substantially on a transverse line passing through the center of the cut-away portion 61 of the carrier member 52. This pin 65 may be colored or otherwise distinguished from the other pins 64 of the series and serves to indicate the variable writing line of the posting device. The holding pins 64 and pin 65 are adapted to engage certain of the equally spaced marginal perforations 66 of the earnings record sheet 14. After the record sheet 14 is positioned on the carrier member 52 and impaled on the holding pins 64 and the desired entry line aligned with the colored pin 65, the perforated voucher check form 16 is then collated on the auxiliary sheet holder 50.

It will now be clear from the foregoing detail description, that in preparing the device for use the shiftable auxiliary sheet holding unit 50 and normally stationary guard plate 41 are removed from the base 20. The device is then ready and prepared for the initial operation of collating the forms in predetermined relation for posting a line of entries. The steps in the use of the device will be explained to show what would take place from week to week in preparing the payroll records.

In most modern payroll procedures, the employee's names are imprinted on the master payroll sheet prior to the posting operation by a typewriter or addressing machine. Therefore, the first step in the use of the present invention resides in impaling the weekly or departmental master payroll register or journal sheet 10 on the pins 24 so as to position the sheet on the writing bed 21 in the position shown by the full lines in Fig. 4. The carbon strip 26 is then drawn through the the slot 40 so as to overlie the earnings and deduction portion 12 of the master sheet 10. The front guard plate 41 is then mounted on the base by inserting the studs 43 in the holes 42 of the base 20. After these preliminary steps are completed, the auxiliary sheet holding unit 50 is then mounted on the base 20.

The auxiliary unit 50 is readily handled by the operator by grasping the grip bar 51 which supports the sheet carrier member 52. In mounting the auxiliary unit 50 on the writing bed surface 21, the groove 54 of the grip bar is registered with the longitudinal rows of guide pins 55 on the base. By raising either end of the grip bar, preferably the end nearest the operator, the auxiliary unit 50 is shifted on the base until the desired employee's name appears through the sight aperture 68 of the carrier member 52. After the auxiliary unit is shifted, with the assistance of the colored stud 65, to disclose the desired entry line on the master sheet 10, the centering pin 56 on the base will readily enter one of the recesses 57 of the bar 51. The pin 56 not only aligns the cut-away formation of the auxiliary unit with a predetermined entry line of the master sheet 10 but also prevents any displacement of the unit during a posting operation. As shown in Fig. 1, it has been found preferable to initially position the auxiliary carrier 50 with the uppermost entry line of the master sheet upon which items are to be posted.

Figure 3:
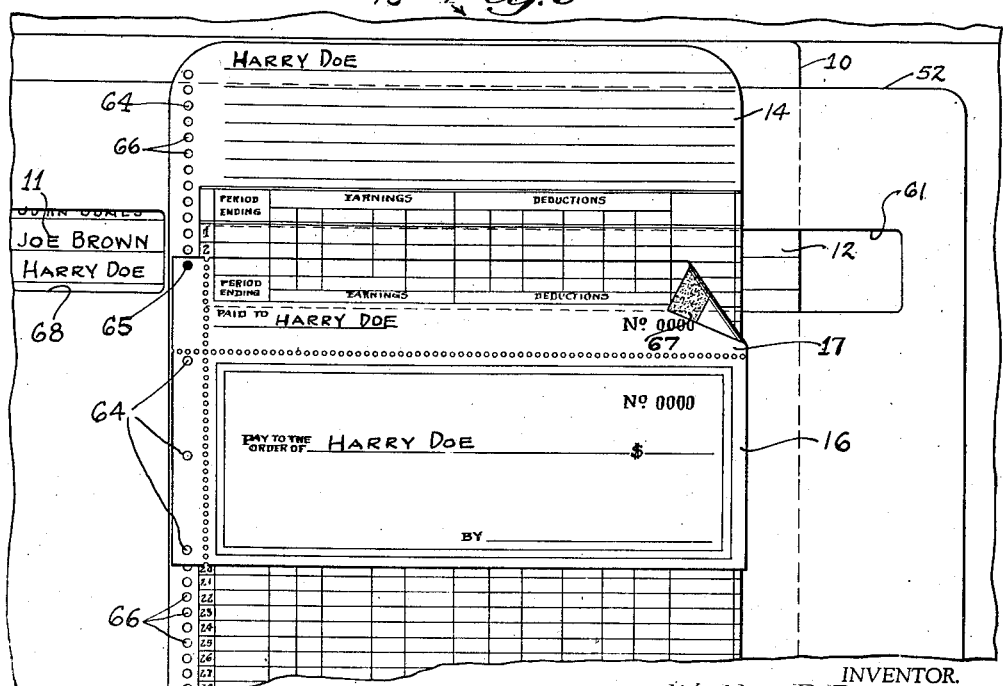
Fig. 3 is an enlarged fragmentary plan view similar to Fig. 2, but showing a second record sheet positioned on the shiftable auxiliary sheet holding unit, such as a voucher payroll check superimposed upon the earning record sheet.

The next step in the collating operation is to position upon the auxiliary holding unit 50 the individual earnings or compensation record sheet 14 for the employee whose name appears through the sight aperture 68 of the carrier member 52. The proper record sheet 14 is impaled on the pins 64 with the desired weekly entry line opposite the indicator pin 65. The final step in collating consists in impaling the voucher check 16 on the pins 64 so that the entry line on the upper voucher portions 17 is in line with the indicator pin 65. While a carbon sheet may be interposed between the record sheet 14 and the voucher portion 17 of the check, it has been found more expedient to strip or spot carbonize the back of the voucher panel as indicated at 67. With the various forms collated as above described, the weekly items having to do with the earnings and deductions of the specific employee named may be posted on the original and transferred to the proper entry lines of the underlying payroll records. Referring by way of example to Fig. 3 of the drawings, the master payroll sheet 10, earnings record 14, and check 16 are shown collated on the device in manifolding relation. However, in this view the auxiliary sheet holding unit 50 is shown shifted and the earnings records positioned differently from that shown in Fig. 2 of the drawings.

After the entry line of the voucher portion 17 of the pay check 16 has been posted, both the voucher check 16 and the record sheet 14 are removed from the auxiliary holding unit 50 as the posting operation for a specific employee has been completed. In continuing the payroll operations, the auxiliary unit 50 is shifted to expose the second name on the master payroll sheet 10 through the sight aperture 68. By shifting the unit 50 the pin 65 and the cut-away formation 61 or writing line of the device is registered with the next or second entry line of the sheet 10 to be posted. This is accomplished by the operator's grasping the grip bar 51 and raising one end sufficiently to disengage the centering pin 56 from a recess 57. However, it is not necessary to raise the bar sufficiently to disengage the groove 54 of the bar 51 from cooperation with the series of pins 55. Therefore, with the centering pin 56 disengaged, the auxiliary unit may be shifted, and through the cooperation of the pins 55 with the groove 54 of the bar it may be guided to move in a straight longitudinal path.

In shifting the auxiliary unit 50 one space, the centering pin engages the next recess 57 of the bar 51 so as to accurately position the unit with respect to the second or predetermined entry line of the master payroll sheet 10. The earnings record sheet 14 and the voucher check 16 corresponding to the second named employee on the master sheet 10 are then positioned on the auxiliary holding unit in the same manner explained in connection with the first set of forms. After the earnings and deduction items are posted, the earnings record and check are removed and the collating operation repeated for each employee named on the master sheet 10.

It has been found expedient to shift the master sheet 10 after the upper half of the sheet has been posted. In this way, the writing line of the device is always in a favorable writing position. To shift the sheet 10, it is only necessary to lift it from the initial position shown by full lines in Fig. 4 and reposition the sheet to the location shown by the dotted lines in this figure. In the dotted line position, the lower half of the sheet may be readily posted.

Due to the fact that the forms commonly used in payroll or bookkeeping operations are usually made of different paper stocks, printed at different times, and in some cases, obtained from different suppliers, it is not uncommon to find that the horizontal and vertical lines do not register when the forms are placed in superimposed relation. This situation is somewhat aggravated when the forms are positioned by perforations punched in the course of fabrication. The variations in the forms may be the result of manufacturing inaccuracies or develop after the forms are produced because of the well known changes which take place in paper due to atmospheric conditions. The present invention provides means to overcome the difficulties arising as the result of variations in the different forms of the character above mentioned. As previously explained, the sheet carrier member 52 is normally rigidly supported by the grip bar 51. However, by loosening the bolts 58 the member 52 may be shifted with respect to the bar 51 by reason of the enlarged apertures 59 provided in the member 52. By slightly shifting the member 52, the sheet positioning and holding studs 64 are moved so that the lines, for example, on the record sheet 14, may be registered accurately with the corresponding lines on the underlying master sheet 10. After the lines of the forms to be posted are in substantial registration, the bolts 58 are tightened so that the sheet carrier member 52 supporting the holding pins 64 is rigid with the grip bar 51. Ordinarily, once the sheet holding parts are adjusted to accommodate the forms of a set it is unnecessary to make any further changes in the setting of the device.

The needs of certain payroll installations often require the use of different size sheet carrier members 52. For example, one division of a business may require additional columns on the payroll forms to post all of the necessary items concerning an employee's earnings and deductions. Obviously, such requirements necessitate wider sheets to accommodate the additional entries. The construction affords readily removing one sheet carrier member 52 and replacing it with one of a different size and having differently arranged apertures. In changing the carrier member 52, it is only necessary to withdraw the bolts 58 from the grip 51 so as to permit the carrier member to be pulled from the slot 60. The substitute members 52 may vary in overall length and the sight aperture 68 as well as the cut-away formation 61 may be longer or shorter according to the layout of the entry lines of the forms to be posted. Obviously, the position of the row of holding pins 64 may be modified dependent upon the length of the sight aperture 68. In the event different types and styles of record sheets, such as earnings records and voucher checks, are essential in the bookkeeping or payroll operations of a user of the present invention, it is possible to provide a different auxiliary sheet holding unit 50 for each type of work. In this way, it is merely necessary to mount the particular auxiliary unit 50 on the base 20 that is adapted and arranged to handle the specific set of forms.

A slightly modified form of the invention, especially adapted to handle special types of forms, is shown in Figs. 16 to 21 inclusive. In this embodiment, instead of the longitudinally arranged row of positioning and holding pins 64 being rigidly mounted on the sheet carrier member 52, they are carried by an independent strip 70 adjustably supported on the carrier member 52. As best seen in Fig. 20, the modified sheet carrier member 52a is provided with a longitudinally arranged row of elongated holes 71. A strip 70, best seen in Fig. 19, carries a longitudinal row of pins 64a and is adjustably supported on the back of the carrier member 52a, Fig. 18. A headed rivet 72 carried by the strip 70 engages the elongated slot 73 of the member 52a and supports one end of the strip 70. The opposite end of the strip 70 is supported by the bolt 74 passing through the elongated slot 75 of the strip 70. The pins 64a are arranged to project through the slots 71 of the member 52a and are adapted to receive and removably retain the record sheet 14 positioned on the auxiliary sheet holding unit 50. The sheet carrier member 52a is provided with a pointed projection 76 to indicate the constant writing line of the sheet carrier 52a.

The adjustable pin strip 70 provides for positioning every entry line of the earnings record sheet 14 at the writing line of the device even though the marginal punchings 66 therein are of a spacing different from that of the entry lines. For example, in the event the entry lines of the earning sheet 14 are spaced one-quarter inch apart and the punchings 66 are spaced one-half inch apart, it would be impossible to position every other entry line at the writing line of the device unless some provision was made for altering the position of the holding pins 64. In order to overcome this difficulty and provide greater flexibility, the present invention is arranged to permit the pins to be shifted to accommodate forms wherein the perforations are spaced differently than the entry lines thereof.

Referring to Fig. 16, it will be seen that the perforations 66a of the record sheet 14 are spaced to align with every other entry line thereof. In this view of the drawings, the pin strip 70 is adjusted on the sheet carrier 52a so that the colored stud 65a is aligned with the writing line indicator 76. In this position, the pins 64a are adapted to locate the record sheet 14 with the No. 1 entry line in register with the writing line of the device. Obviously, with the pin strip 70 in position shown in Fig. 16, the record sheet 14 may be positioned so as to position any odd numbered entry line in register with the writing line of the auxiliary unit 50. It is to be understood that in payroll operations the same entry line would be used for all record sheets posted for a given week or period. Therefore, it is only necessary to adjust the pin strip 70 once for such period.

In order to position the pin strip 70 so that the entry line No. 2, or for that matter any even numbered entry line, may be registered with the writing line of the sheet carrier 52a and of the device, the pin strip is shifted to the position shown in Fig. 17. In this position, the pins 64a of the strip 70 have been shifted rearward so that the entry line No. 2 is in register with the pointer 76 of the sheet carrier 52a. After all the posting operations have been entered on the earnings record for the second week, the pin strip 70 is again shifted to the position shown in Fig. 16 so that the earnings record sheets 14 may be properly mounted on the device for posting earnings on the next odd numbered entry line. Obviously, the shiftable pin strip and movement thereof may be arranged to permit adjustment for any punching that varies from the spacing of the entry lines of the earnings or compensation record sheet.

In the modified form of the auxiliary sheet holding unit it has been found desirable to position the holding pins for the voucher check 16 on the right end of the sheet holding member 52a. As seen in Figs. 16 and 17, holding pins 69 carried by the sheet holding member 52a are adapted to receive and removably retain the check 16a. A detachable end stub portion 78 of the voucher check 16a is provided with perforations to engage the pins 69. With this arrangement, the shiftable pin strip 70 carrying the pins 64a may be moved as described without altering the location of the check holding pins 69.

While certain embodiments of the invention have been disclosed and described, it is to be understood that the inventive idea may be carried out in a number of ways. This application is therefore not limited to the precise details described but is intended to cover all variations and modifications thereof falling within the spirit of the invention or scope of the appended claims.

I claim:

1. A collating and posting device having a variable writing line and being adapted for use in posting items on a plurality of sheets positioned thereon in superimposed relation with transfer means therebetween having in combination, a base affording a writing bed, means on the upper surface of said base adapted to receive and removably retain a master sheet having successive lines upon which entries are to be posted, an auxiliary sheet holding unit slidably mounted on the upper surface of said base for longitudinal movement with respect to the underlying master sheet, said auxiliary unit including a manual grip bar and carrier means supported by the bar adapted to receive and removably retain a record sheet having a line upon which entries are to be posted, a series of longitudinally spaced guide pins arranged on said base and projecting above the plane of the upper surface of the base, said grip bar having a longitudinal groove formed therein and adapted to engage said series of pins to guide said auxiliary unit through its path of movement, said grip bar also having a series of centering recesses spaced to substantially correspond with the spacing of the entry lines of the master sheet, and a locating pin supported on said base for cooperation with any one of the recesses of said series in said bar and being adapted to position said auxiliary unit with the entry line of the record sheet supported thereon in register with a predetermined entry line of the underlying master sheet.

2. A collating and posting device having a variable writing line and being adapted for use in manually posting items on a plurality of sheets positioned thereon in superimposed relation with transfer means therebetween having in combination, a base affording a writing bed, means on the upper surface of said base adapted to receive and removably retain a master sheet having successive lines upon which entries are to be posted, an auxiliary sheet holder slidably mounted on the upper surface of said base for longitudinal movement with respect to the underlying master sheet and being adapted to support one or more record sheets having a line upon which entries are to be posted, said auxiliary holder including a manually movable grip bar and means carried thereby adapted to receive and removably retain a record sheet, a series of longitudinally spaced guide pins arranged on said base and projecting above the plane of the upper surface of the base, said grip bar having a longitudinal groove formed therein and adapted to engage said series of pins to guide said auxiliary holder through its path of movement, said grip bar having a series of equally spaced recesses formed in the bottom of said groove, one of the guide pins of said series being of a length greater than the depth of the groove formed in said bar and being adapted to enter a recess of said series so as to position said auxiliary holder with the entry line of a record sheet supported thereon in manifolding register with a predetermined entry line of the underlying master sheet.

3. A collating and posting device having a variable writing line and being adapted for use in posting items on a plurality of sheets positioned thereon in superimposed relation with transfer means therebetween having in combination, a base affording a writing bed, means on the upper surface of said base adapted to receive and removably retain a master sheet having successive lines upon which entries are to be posted, a displaceable auxiliary sheet holding unit slidably mounted on the upper surface of said base for longitudinal movement with respect to the underlying master sheet and being adapted to support one or more superimposed record sheets having a line upon which entries are to be posted, said auxiliary unit including a manually movable grip bar and means carried by said bar adapted to receive and removably retain the record sheet, a series of longitudinally spaced guide pins arranged on said base and projecting above the plane of the upper surface of the base, said grip bar having a longitudinal groove formed therein and adapted to engage said series of pins to guide said auxiliary unit through its path of movement, said grip bar also having a series of recesses formed in the bottom of said groove and spaced to substantially correspond with the spacing of the entry lines of the master sheet, one of said guide pins of said series being of a length greater than the depth of the groove formed in said bar and adapted to enter one of said recesses to position said auxiliary unit with the entry line of a record sheet supported thereon in register with a predetermined entry line of the underlying master sheet.

4. A collating and posting device having a variable writing line and being adapted for use in manually posting items on a plurality of sheets positioned thereon in superimposed relation with transfer means therebetween having in combination, a base affording a writing bed, means on the upper surface of said base adapted to receive and removably retain a master sheet having successive lines upon which entries are to be posted, a displaceable auxiliary sheet holding unit slidably mounted on the upper surface of said base for longitudinal movement with respect to the underlying master sheet and being adapted to support one or more record sheets having a line upon which entries are to be posted, said auxiliary unit including a manually shiftable grip bar and a rectangular-shaped sheet carrier member having one end supported by said bar, said carrier member overlying the master sheet and having an aperture adapted to denote the writing area wherein entries may be duplicated upon the underlying master sheet, a set of studs on said carrier member adjacent said aperture and being adapted to engage holes in the record sheet and retain same with its line of entry aligned with said aperture, a series of longitudinally spaced guide pins arranged on said base and projecting above the plane of the upper surface of the base, said grip bar having a longitudinal groove formed therein and adapted to engage said series of pins to guide said auxiliary unit through its path of movement, said grip bar also having a series of centering recesses formed in the bottom of said groove and spaced to substantially correspond with the spacing of the entry lines of the master sheet, one of said guide pins of said series being of a length greater than the depth of the groove formed in said bar and being adapted to enter one of said recesses to position said auxiliary unit with the entry line of a record sheet supported thereon in manifolding register with a predetermined entry line of the underlying master sheet.

5. A collating and posting device having a variable writing line and being adapted for use in manually posting items on a plurality of sheets positioned thereon in superimposed relation with transfer means therebetween having in combination, a base affording a writing bed, means on the upper surface of said base adapted to receive and removably retain a master sheet having successive lines upon which entries are to be posted, a removable auxiliary sheet holder slidably mounted on the upper surface of said base for longitudinal movement with respect to the underlying master sheet and being adapted to support one or more record sheets having a line upon which entries are to be posted, said auxiliary holder including a manually shiftable grip bar and a rectangular-shaped sheet carrier member having one end supported in said bar, said carrier member overlying the master sheet and having a cut-away formation adapted to denote the writing line of the device, a set of pins on said carrier member adjacent said cut-away formation adapted to receive and hold a record sheet with its line of entry aligned with said cut-away formation, a series of longitudinally spaced guide pins arranged on said base and projecting above the plane of the upper surface of the base, said control bar having a longitudinal groove formed therein and adapted to engage said series of pins to guide said auxiliary holder through its path of movement, said control bar also having a series of recesses formed in the bottom of said groove and spaced to substantially correspond with the spacing of the entry lines of the master sheet, one of said guide pins of said series being of a length greater than the depth of the groove formed in said bar and being adapted to enter one of said recesses to position said auxiliary holder with the entry line of a record sheet supported thereon in register with a predetermined entry line of the underlying master sheet, and means for adjusting said sheet carrier member relative to the master sheet on said base so as to bring the entry line of the record sheet into alignment for accurate registration with the entry line of the master sheet.

6. A collating and posting device having a variable writing line and being adapted for use in manually posting items on a plurality of payroll record sheets positioned thereon in superimposed relation with transfer means therebetween having in combination, a base affording a writing bed, means on the upper surface of said base adapted to receive and removably retain a master sheet having successive lines upon which entries are to be posted, said means comprising two or more spaced studs projecting above the plane of the upper surface of said base and being adapted to engage holes in the master sheet, a removable auxiliary sheet holding unit slidably mounted on the upper surface of said base for longitudinal movement with respect to the underlying master sheet and being adapted to support one or more record sheets each having a line upon which entries are to be posted, said auxiliary holding unit including a manually movable grip bar and carrier member supported at one end by said bar, a set of pins on said carrier member adapted to receive and removably retain the record sheets for movement with the holding unit, and a series of longitudinally spaced guide pins arranged on said base and projecting above the plane of the upper surface of the base, said grip bar having a longitudinal groove formed therein and adapted to engage said series of pins to guide said auxiliary unit through its path of movement, said grip bar also having a series of recesses formed in the bottom of said groove and spaced to substantially correspond with the spacing of the entry lines of the master sheet, one of said guide pins of said series being of a length greater than the depth of the groove formed in said bar and being adapted to enter one of said recesses to position said auxiliary unit with the entry lines of a record sheet supported thereon in register with a predetermined entry line of the underlying master sheet.

7. A collating and posting device having a variable writing line and being adapted for use in manually posting items on a plurality of sheets positioned thereon in superimposed relation with transfer means therebetween having in combination, a base affording a writing bed, means on the upper surface of said base adapted to receive and removably retain a master sheet having successive lines upon which entries are to be posted, a displaceable auxiliary sheet holding unit slidably mounted on the upper surface of said base for longitudinal movement with respect to the underlying master sheet and being adapted to support one or more record sheets having a line upon which entries are to be posted, said auxiliary unit including a manual grip bar and an apertured masking member carried by the bar, means on said masking member adapted to receive and removably retain a record sheet, a series of longitudinally spaced guide pins arranged on said base and projecting above the plane of the upper surface of the base, said grip bar having a longitudinal groove formed therein and adapted to engage said series of pins to guide said auxiliary unit through its path of movement, said grip bar also having a series of centering recesses formed in the bottom of said groove and spaced to substantially correspond with the spacing of the entry lines of the master sheet, one of said guide pins of said series being of a length greater than the depth of the groove formed in said bar and being adapted to enter one of said recesses to position said auxiliary unit with the entry line of a record sheet supported thereon in register with a predetermined entry line of the underlying master sheet.

8. A collating and posting device having a variable writing line and being adapted for use in manually posting items on a plurality of sheets positioned thereon in superimposed relation with transfer means therebetween having in combination, a base affording a writing bed surface, means on the bed surface adapted to receive and removably retain a master sheet having successive lines upon which entries are to be posted, means on said base for supporting a roll of carbon paper having the leading end thereof arranged to overlie the master sheet, a detachable auxiliary sheet holding unit shiftably mounted on said bed surface and adapted to carry one or more record sheets having a line upon which entries are to be posted, said auxiliary unit including a manual grip bar and a carrier member, said carrier member having one end fixed to said grip bar and a free end overlying the carbon strip and master sheet adapted to serve as a guard to prevent transfer of carbon other than desired to the master sheet, said carrier member having a cut-away formation adjacent the top edge adapted to provide a writing line portion at which entries may be transferred to the master sheet, means on said carrier member to receive and removably retain one or more record sheets with the entry line thereof in alignment with the cut-away writing line portion of said member, means on said bed surface adapted to cooperate with said grip bar for positioning said auxiliary unit so that the entry line of the record sheet carried thereby is in positive manifolding register with a predetermined selected entry line of the underlying master sheet, and a stationary carbon guard member removably mounted adjacent the front edge of said bed surface adapted to protect the carbon paper when said auxiliary unit is shifted to certain positions.

9. A collating and posting device having a variable writing line and being adapted for use in manually posting items on a plurality of sheets positioned thereon in superimposed relation with transfer means therebetween having in combination, a base affording a writing bed surface, two spaced longitudinally arranged rows of pins projecting above the writing bed surface of said base and adjacent one side thereof, the innermost row of said pins adapted to engage holes in a master sheet impaled thereon having successive lines upon which entries are to be posted, a removable auxiliary sheet holding unit slidably mounted on said base for longitudinal movement with respect to the entry lines of the master sheet, said auxiliary unit including a sheet carrier member overlying the master sheet and a manual grip bar secured thereto, said carrier member having means to receive and removably retain one or more record sheets having a line upon which entries are to be posted, said grip bar having a longitudinal groove formed therein and a series of spaced recesses formed in the bottom of the groove, the groove of said bar being adapted to cooperate with the other of said rows of pins to guide the auxiliary unit during movement thereof, one of the pins of the other of said rows of pins being of a length greater than the depth of the groove formed in said bar and adapted to enter a recess formed in said bar, the arrangement being such that as the auxiliary unit supporting the record sheet is moved on the base the other of said row of pins serves to guide same in its path of movement and the longer pin of the row cooperating with any one of the recesses permits the unit to be readily positioned so that the entry line on the record sheet is in register with a predetermined entry line of the underlying master sheet.

10. A collating and posting device having a variable writing line and being adapted for use in manually posting items on a plurality of sheets positioned thereon in superimposed relation with transfer means therebetween having in combination, a base affording a writing bed, two spaced longitudinally arranged rows of pins projecting from the upper surface of said base and parallel to the side edges thereof, one row of said pins serving as holding pins adapted to engage holes in a master sheet impaled thereon having successive lines upon which entries are to be posted, a removable auxiliary sheet holding unit slidably mounted on said base for longitudinal movement with respect to the entry lines of the master sheet, said auxiliary unit including a sheet carrier member adapted to overlie the master sheet and a manual grip bar secured thereto, means on said carrier member adapted to receive and removably retain one or more record sheets having a line upon which entries are to be posted, said grip bar having a longitudinal groove formed therein and a series of spaced recesses formed in the bottom of the groove, the groove of said bar being adapted to cooperate with the other of said rows of pins to guide the auxiliary unit during movement thereof, one of the pins of the other of said rows of pins being of a length greater than the depth of the groove formed in said bar and adapted to enter any one of the recesses formed in the said bar, the arrangement being such that the auxiliary unit is adapted to be raised slightly to displace the long pin from the recess in the bar and slidably guided by the other of said rows of pins to a different position, and when subsequently lowered the long pin again enters a recess of the bar to position the auxiliary unit with the entry line for a record sheet in accurate register with a different entry line of the underlying master sheet.

11. A collating and posting device having a variable writing line and being adapted for use in posting items on a plurality of sheets positioned thereon in superimposed relation with transfer means therebetween having in combination, a base affording a writing bed, a group of holding pins on the upper surface of said base adapted to engage holes in a master sheet having successive lines upon which entries are to be posted, a manually manipulated grip bar slidably mounted adjacent said holding pins on the upper surface of said base for longitudinal movement with respect to the master sheet, said bar having a slot formed in the side thereof adjacent said holding pins and above the plane of the extremities of the holding pins, a flexible sheet holding member having one end adjustably mounted in the slot of said shiftable grip bar, the other end of said holding member adapted to overlie the master sheet, means on said holding member adapted to receive and removably retain one or more record sheets having a line upon which entries are to be posted, a second series of longitudinally spaced guide pins arranged on said base and projecting above the plane of the upper surface of the base, said grip bar having a longitudinal groove formed therein and adapted to engage said second series of pins for guidance through its path of movement, said grip bar also having a series of centering recesses spaced to substantially correspond with the spacing of the entry lines of the master sheet, and means on said base for cooperation with any one of the recesses of said series in said bar and being adapted to position the holding member associated with the bar so that the entry line of a record sheet supported on the member is in register with a predetermined entry line of the underlying master sheet, and means carried by said grip bar for adjusting said holding member with respect to the master sheet so as to correct any error in the alignment of the entry line of the record sheet carried by the holding member with the entry lines of the underlying master sheet.

12. A collating and posting device having a variable writing line and being adapted for use in posting items on a plurality of sheets positioned thereon in superimposed relation with transfer means therebetween having in combination, a base affording a writing bed, a group of holding pins on the upper surface of said base adapted to engage holes in a master sheet having successive lines upon which entries are to be posted, a manually manipulated grip bar slidably mounted adjacent said holding pins on the upper surface of said base for longitudinal movement with respect to the master sheet, said bar having a slot formed in the side thereof adjacent said holding pins and above the plane of the extremities of said pins, a sheet holding member adapted to receive and removably retain one or more record sheets having a line upon which entries are to be posted, said holding member having one end mounted in the slot of said bar and arranged for movement with the bar over the ends of said holding pins, the free end of said holding member adapted to overlie the master sheet, and means on said base cooperating with said grip bar adapted to guide and position the shiftable bar and its associated sheet holding member so that the entry line of a record sheet supported on said holding member is registered with a predetermined entry line of the underlying master sheet.

13. A collating and posting device having a variable writing line and being adapted for use in posting items on a plurality of sheets positioned thereon in superimposed relation with transfer means therebetween having in combination a base affording a writing bed, a group of holding pins on the upper surface of said base adapted to engage holes in a master sheet having successive lines upon which entries are to be posted, a manually manipulated grip bar slidably mounted adjacent said holding pins on the upper surface of said base for longitudinal movement with respect to the master sheet, said bar having a slot formed in the side thereof adjacent said holding pins and above the plane of the extremities of the holding pins, a flexible sheet holding member having one end mounted in the slot of said shiftable grip bar and free for movement over the ends of said holding pins, the opposite end of said holding member adapted to overlie the master sheet, means on said holding member adapted to receive and removably retain one or more record sheets having a line upon which entries are to be posted, a second series of longitudinally spaced guide pins arranged on said base and projecting above the plane of the upper surface of the base, said grip bar having a longitudinal groove formed therein and adapted to engage said second series of pins for guidance through its path of movement, said grip bar also having a series of centering recesses spaced to substantially correspond with the spacing of the entry lines of the master sheet, and a locating pin supported on said base for cooperation with any one of the recesses of said series in said bar and being adapted to position the holding member associated with the bar so that the entry line of a record sheet supported on the member is in register with a predetermined entry line of the underlying master sheet.

14. A collating and posting device having a variable writing line and being adapted for use in posting items on a plurality of sheets positioned thereon in superimposed relation with transfer means therebetween having in combination, a base affording an inclined writing bed, a group of holding pins on the upper surface of said base adapted to engage holes in a master sheet having successive lines upon which entries are to be posted, a detachable manually manipulated grip bar slidably mounted adjacent said holding pins on the upper surface of said base for longitudinal movement with respect to the master sheet, said bar having a slot formed in the side thereof adjacent said holding pins and above the plane of the extremities of said pins, a flexible sheet holding member adapted to support one or more record sheets having a line upon which entries are to be posted, said holding member having one end adjustably mounted in the slot of said bar so that it is adapted to be moved over said holding pins, the other end of said holding member adapted to overlie the master sheet, means on said holding member for positioning a record sheet thereon, a second group of longitudinally spaced guide pins arranged on the upper surface of said base, said grip bar having a longitudinal groove formed in the bottom thereof adapted to engage said second group of pins for guiding the bar along its longitudinal path of movement, a series of recesses formed in the bottom of the guide groove of said bar and spaced to substantially correspond with the spacing of the entry line of the master sheet, one of the guide pins of said second group of pins being of a length greater than the depth of the guide groove formed in said bar and adapted to enter any recess of said series so as to accurately align said holding member carried by the bar with the entry line of the record sheet thereon in register with a predetermined entry line of the underlying master sheet, and means for adjustably securing said holding member to said grip bar.

15. A collating and posting device having a variable writing line and being adapted for use in posting items on a plurality of sheets positioned thereon in superimposed relation with transfer means therebetween having in combination, a base affording a writing bed, means on the upper surface of said base adapted to receive and removably retain a master sheet having entry lines upon which entries are successively posted, a displaceable auxiliary sheet holding unit having a common writing line slidably mounted on the upper surface of said base for longitudinal movement with respect to the underlying master sheet to position the writing line of the auxiliary unit into register with a predetermined entry line of the underlying master sheet, said auxiliary unit having a sheet carrier portion adapted to support a record sheet having a plurality of entry lines and marginal positioning apertures spaced differently from that of the entry lines of the sheet, a pin strip slidably mounted on said sheet carrier and having a series of holding pins adapted to engage the positioning apertures of the record sheet, said pin strip adapted to be shifted on said sheet carrier portion of said auxiliary unit so that a predetermined entry line of the record sheet impaled on the holding pins may be aligned with the writing line of the auxiliary unit, whereby entries posted on said predetermined entry line of the record sheet may be transferred to the predetermined entry line of the underlying master sheet.

16. A collating and posting device having a variable writing line and being adapted for use in posting items on a plurality of sheets positioned thereon in superimposed relation with transfer means therebetween having in combination, a base member affording a writing bed surface and an auxiliary sheet holding member slidably mounted on said base, means on the upper surface of said base member adapted to receive and removably retain a master sheet having successive lines upon which entries are to be posted, means on said holding member adapted to receive and removably retain a record sheet having a line upon which entries are to be posted, a series of longitudinally spaced projecting guide pins arranged on said base, said holding member having a longitudinal groove formed therein and adapted to engage said series of pins to guide the slidable holding member through its path of movement, a series of centering recesses formed in one of said members and spaced to substantially correspond with the spacing of the entry lines of the master sheet, and a locating pin supported on the other of said members for cooperation with any of the recesses of said series and being adapted to position the slidable holding member with the entry line of the record sheet supported thereon in register with a predetermined entry line of the underlying master sheet.

17. A collating and posting device having a variable writing line and being adapted for use in posting items on a plurality of sheets positioned thereon in superimposed relation with transfer means therebetween having in combination, a base member affording a writing bed surface and an auxiliary sheet holding member slidably mounted on said base, means on the upper surface of said base member adapted to receive and removably retain a master sheet having successive lines upon which entries are to be posted, means on said holding member adapted to receive and removably retain a record sheet having a line upon which entries are to be posted, one of said members having a series of longitudinally spaced projecting guide pins arranged thereon, the other of said members having a longitudinal groove formed therein and adapted to engage said series of pins to guide the slidable member through its path of movement, a series of centering recesses formed in said holding member and spaced to substantially correspond with the spacing of the entry lines of the master sheet, and a locating pin supported on said base member for cooperation with any of the recesses of said series and being adapted to position said slidable holding member with the entry line of the record sheet supported thereon in register with a predetermined entry line of the underlying master sheet.

18. A collating and posting device having a variable writing line and being adapted for use in posting items on a plurality of sheets positioned thereon in superimposed relation with transfer means therebetween having in combination, a base member affording a writing bed surface and an auxiliary sheet holding member slidably mounted on said base, means on the upper surface of said base member adapted to receive and removably retain a master sheet having successive lines upon which entries are to be posted, means on said holding member adapted to receive and removably retain a record sheet having a line upon which entries are to be posted, one of said members having a series of longitudinally spaced projecting guide pins arranged thereon, the other of said members having a longitudinal groove formed therein and adapted to engage said series of pins to guide the slidable member through its path of movement, a series of centering recesses formed in one of said members and spaced to substantially correspond with the spacing of the entry lines of the master sheet, and a locating pin supported on the other of said members for cooperation with any of the recesses of said series and being adapted to position the slidable member with the entry line of the record sheet supported thereon in register with a predetermined entry line of the underlying master sheet.

WALTER B. PAYNE.